Patented June 30, 1931

1,812,639

UNITED STATES PATENT OFFICE

CHARLES G. MOORE, OF LAKEWOOD, AND MILTON ZUCKER, OF CLEVELAND, OHIO, ASSIGNORS TO THE GLIDDEN COMPANY, OF CLEVELAND, OHIO, A CORPORATION OF OHIO

SYNTHETIC RESIN COMPOUND AND PROCESS OF PREPARING THE SAME

No Drawing. Application filed July 1, 1929. Serial No. 375,320.

Since the investigations reported by J. Watson Smith (Jour. Soc. Chem. Ind. 1901: 1075), synthetic resins of the polybasic acid-polyhydric alcohol type have become quite well known, and many efforts have been made to develop a resin of this type which would be suitable for practical usage in the varnish and paint industry. Notwithstanding the various suggestions which have been made, and the numerous fatty acids which have been proposed, resins of this type have not offered a satisfactory base for varnishes, by reason of lacking the toughness and elasticity desirable. In accordance with the present invention however, preparations may be had which afford a satisfactory film as applied in protective coating usage.

In proceeding in accordance with our invention, a polybasic acid-polyhydric alcohol resin is prepared with the acids of rubber seed oil. For the polybasic acid component, phthalic anhydride, succinic acid, citric acid, and the like may be employed, and for the polyhydric alcohol, glycerol, glycol, polyglycerol, polyglycol, and the like are available. Ordinarily, phthalic anhydride and glycerol are desirable. The rubber seed oil acids may be prepared in any convenient hydrolytic procedure, for instance by saponifying the oil with sufficient caustic soda to saponify the glycerides, and subsequently precipitating the fatty acids by a displacing acid.

In a preferred form of our invention, rubber seed oil acids, phthalic anhydride, and glycerol are heated together, in the proportions for instance of 4.73 parts by weight of rubber seed oil acids, 6.75 parts of phthalic anhydride, and 3.6 parts of 95 per cent. glycerol. The reaction mixture may be heated in a varnish kettle, the temperature being carried to 175° C. in as short a time as possible. This will vary from 20 minutes to 1 hour, depending upon the size of the batch and the fire. At this point, the esterification begins, with the elimination of water. Care should be taken at this time not to heat at too rapid a rate, as the elimination of the water occasions considerable frothing. The temperature is slowly run up to about 250° C. (in 40 minutes to 1 hour). By the time 250° C. is reached, the esterification is well along and polymerization sets in. If the polymerization reaction is carried too far, a critical point is reached where an exothermic reaction sets in with gelation of the entire mass. However the polymerization can safely be continued for 40 minutes to about an hour without serious damage. When a test sample shows the resin to be free from tackiness and fairly tough on being cut with a knife, the heating is discontinued. The resin may then be poured out and cooled for solution later, or it may be dissolved hot in the kettle. Convenient solvents are the aromatic hydrocarbons, benzol, toluol, etc., also aliphatics, naphtha, and the like may be used. The resins are also soluble in alcohols, ethers and esters.

Rubber seed oil, when extracted by ether, has a relatively high acid value; and this property, together with poor drying and other characteristics has heretofore rendered it unsuitable for paint purposes. Its low cost however, and the high acid value in reducing the difficulty of making free fatty acids conduce to economy of manufacture; and in accordance with our invention preparation of excellent resins becomes possible. Made up in a protective coating solution moreover, such resin base as applied in coating usage yields a tougher film when set, than resins heretofore made with acids of even linseed oil.

Other modes of applying the principle of the invention may be employed, change being made as regards the details disclosed, provided the constituents or steps stated in any of the following claims, or the equivalent of such, be employed.

We therefore particularly point out and distinctly claim as our invention:—

1. A synthetic resin, comprising the reaction product of an organic polybasic acid, a polyhydric alcohol, and the fattty acids of rubber seed oil.

2. A synthetic resin, which comprises the reaction product of an organic polybasic acid, glycerol, and the fatty acids of rubber seed oil.

3. A synthetic resin, comprising the reaction product of phthalic anhydride, a polyhydric alcohol, and the fatty acids of rubber seed oil.

4. A synthetic resin, comprising the reaction product of phthalic anhydride, glycerol and the fatty acids of rubber seed oil.

5. A process of the character described, which comprises heating an organic polybasic acid, a polyhydric alcohol, and the fatty acids of rubber seed oil at esterifying temperature, and finally raising the temperature and further heating without complete gelation of the mass.

6. A process of the character described, which comprises heating phthalic anhydride, glycerol and the fatty acids of rubber seed oil at about 175° C., and slowly raising the temperature to about 250° C.

7. A process of the character described, which comprises heating at about 175° C. phthalic anhydride, glycerol and the fatty acids of rubber seed oil, in the proportions of about 6.75 parts of phthalic anhydride, about 3.6 parts of glycerol and about 4.73 parts of rubber seed oil acids, all by weight, and slowly raising the temperature to about 250° C.

8. A composition comprising the reaction product of rubber seed oil acids, phthalic anhydride and glycerol, in the proportions of about 4.73 parts of rubber seed oil acids, about 6.75 parts of phthalic anhydride and about 3.6 parts of 95 per cent. glycerol, all by weight.

9. A process of the character described, which comprises reacting between an organic polybasic acid, a polyhydric alcohol and the fatty acids of rubber seed oil.

10. A process of the character described, which comprises reacting between an organic polybasic acid, glycerol and the fatty acids of rubber seed oil.

11. A process of the character described, which comprises reacting between phthalic anhydride, a polyhydric alcohol and the fatty acids of rubber seed oil.

12. A process of the character described, which comprises reacting between phthalic anhydride, glycerol and the fatty acids of rubber seed oil.

Signed by us this 26th day of June, 1929.

CHARLES G. MOORE.
MILTON ZUCKER.